Feb. 22, 1927.
J. COSENTINO
SHOCK ABSORBER
Filed April 23, 1926
1,618,326
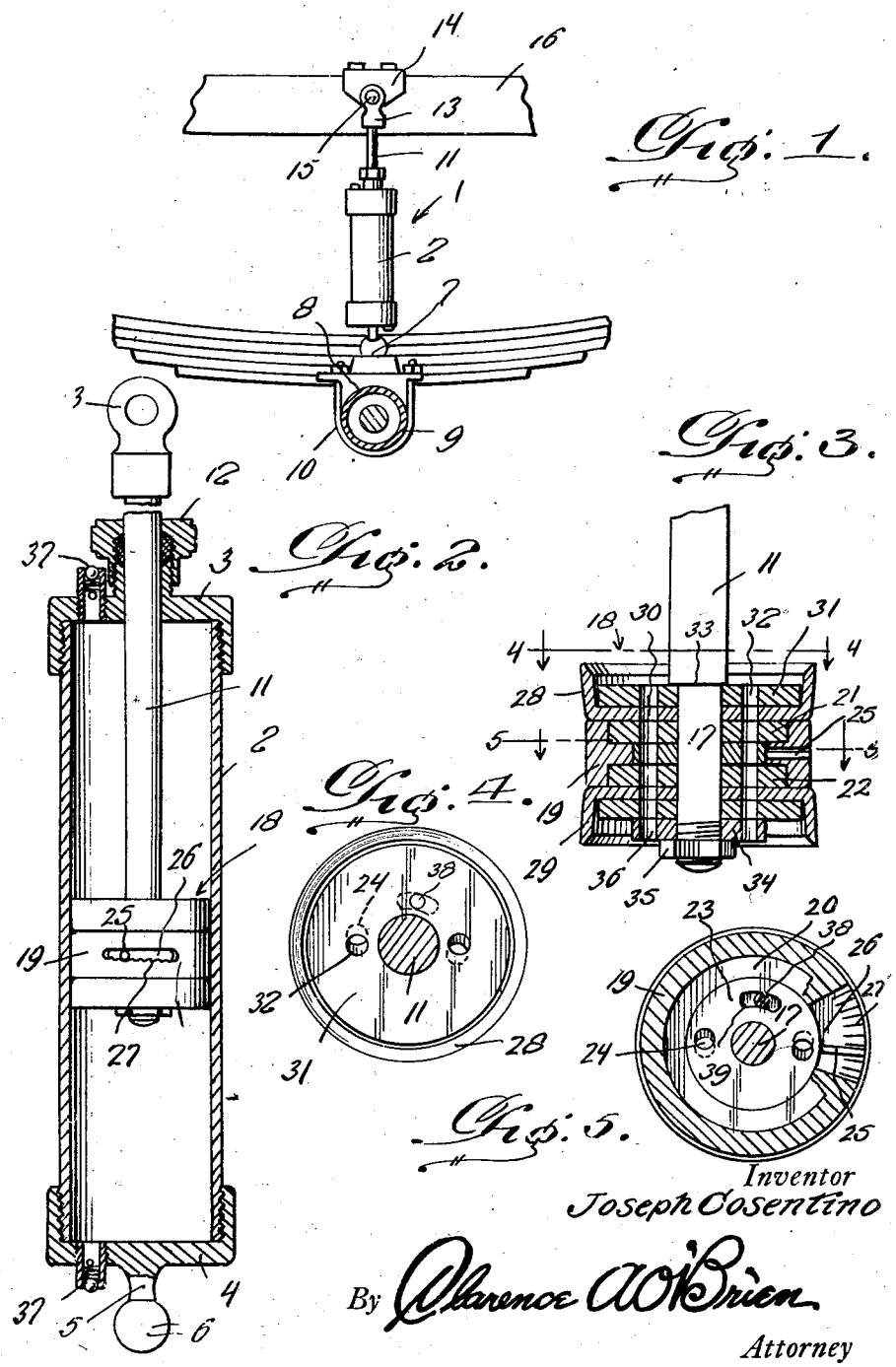
Inventor
Joseph Cosentino
By Clarence A. O'Brien
Attorney Patented Feb. 22, 1927.

1,618,326

UNITED STATES PATENT OFFICE.

JOSEPH COSENTINO, OF CLARKSBURG, WEST VIRGINIA.

SHOCK ABSORBER.

Application filed April 23, 1926. Serial No. 104,084.

The present invention relates to improvements in shock absorbers for use more particularly in connection with spring supported vehicle bodies.

One of the important objects of the present invention is to provide a shock absorber which employs air as the cushioning medium and which is employed for minimizing the shock incident to the vehicle traveling over a rough and uneven road.

Another important object of the invention is to provide a shock absorber which includes a cylinder, and a piston operable therein, means being associated with the piston for controlling the flow of air in the cylinder from either side of the piston.

Another important object of the invention is to provide a shock absorber of the above mentioned character which is simple in construction, inexpensive, strong and durable and further well adapted to the purpose for which it is designed.

Other objects and advantages of the invention will become apparent from the following description taken in connection with the accompanying drawing.

In the accompanying drawing forming a part of this application, and in which like numerals designate like parts throughout the several views:

Figure 1 is a side elevation of the shock absorber embodying my invention showing the same applied to the chassis and axle housing of a spring supported vehicle body.

Figure 2 is a vertical sectional view through the cylinder, the piston being shown in elevation.

Figure 3 is an enlarged vertical sectional view through the piston.

Figure 4 is a transverse section taken approximately on line 4—4 of Figure 3 looking in the direction of the arrows, and Figure 5 is a similar section taken on line 5—5 of Figure 3.

In the drawing wherein for the purpose of illustration is shown the preferred embodiment of my invention, the numeral 1 designates generally my improved shock absorber, the same comprising the cylinder 2, the respective ends of which are open and externally threaded as is clearly shown in Figure 2. Internally threaded cap members 3 and 4 are threaded on the upper and lower ends respectively of the cylinder. A depending shank 5 is formed on the bottom of the lower cap 4, and carried on the lower end of the shank 5 is a ball shaped head 6.

This ball shaped head is adapted for cooperation with a suitable socket 7 which forms a part of the bracket 8, the latter being detachably secured on the axle housing 9 by the securing means shown at 10. In this manner, a universal connection is provided for the lower end of the cylinder with the axle housing.

Slidable through the upper cap 3 is the piston rod 11, and a suitable packing gland designated generally by the numeral 12 is associated with the upper portion of the cap 3 for cooperation with the piston rod 11 in the manner well known in the art. The upper end of the piston rod 11 carries thereon the eye member 13, the same being secured to a suitable bracket 14 as at 15. This bracket 14 is mounted on the side bar 16 of the chassis of an automobile body. It will thus be seen that my improved shock absorber is interposed between the chassis of an automobile body and the spring supported axle.

The lower end of the piston rod 11 is reduced as indicated at 17 with reference more particularly to Figure 3 of the drawing, and the lower end of the reduced portion is externally threaded as also shown in Figure 3. Mounted on the reduced portion 17 of the piston rod 11 is the piston designated generally by the numeral 18, and this piston is adapted for reciprocatory movement within the cylinder 2.

The piston comprises the metal ring 19 which is of a diameter slightly less than the inner diameter of the cylinder 2. An annular flange 20 is formed on the inner face of the intermediate portion of the ring 19 and the purpose thereof will be hereinafter more fully described.

A disc 21 is adapted to rest on the upper face of the annular flange 20 and the upper face of this disc 21 lies substantially flush with the upper edge of the ring 19. It is of course understood that this disc is provided with a central opening to accommodate the reduced portion 17 of the piston rod 11. A similar disc 22 is disposed adjacent the bottom face of the annular flange 20 and the bottom face of the disc 22 lies substantially flush with the lower edge of the ring 19. This disc is also provided with a central opening to accommodate the reduced portion 17 of the piston rod 11.

Interposed between the upper and lower discs 21 and 22 respectively is the central or intermediate disc 23. This intermediate disc is of a diameter slightly less than the inner diameter of the flange 20 and is adapted for rotation about the reduced portion 17 of the piston rod 11 for the purpose also to be hereinafter more fully described.

Each of the discs heretofore described is provided with a pair of diametrically opposed openings such as are shown generally at 24 and these openings or ports are adapted to register with the openings or ports in the adjacent discs as is clearly shown in Figure 3. For the purpose of facilitating the rotation of the intermediate disc 23, there is provided the pin 25 which extends laterally from the peripheral edge of the intermediate disc 23, this pin 25 extending through the elongated slot 26 formed in the ring 19, and also which extends through the flange 20. This construction is more clearly illustrated in Figure 5 of the drawing. The bottom side of the slot 26 is serrated as illustrated at 27 and the outer end of the pin 25 is disposed in the serrations for maintaining and holding the disc 23 in its desired adjusted position against accidental movement.

The piston further includes the upper and lower cup shaped leather washers 28 and 29 respectively, and these leather cup shaped washers are adapted to engage the inner wall of the cylinder 2 in the manner well known in the art. Each of the cup shaped washers is provided with a pair of diametrically opposed openings or ports 30 which are adapted for communication with the openings or ports formed in the discs heretofore described. Cooperating with the cup shaped washers are the metallic washers 31 and these metallic washers are also provided with opposed openings or ports 32 which communicate with the aforementioned ports or openings. The upper face of the metallic washer which is associated with the uppermost cup shaped washer 28 engages the shoulder 33 formed by the reduced portion 17 of the piston rod 11 and a relatively small disc 34 is mounted on the lower end of the reduced portion 17 of the piston rod 11 and the upper face of this relatively small disc engages the bottom face of the metallic washer which is associated with the lower cup shaped leather washer 29. A lock nut 35 is threaded on the lower threaded end of the reduced portion 17 of the piston 11, and maintains the disc in the cup shaped washers in assembled relation on the lower end of the piston rod. The relatively small disc 34 is also provided with a pair of diametrically opposed openings or ports such as are shown at 36 for communication with the ports or openings formed in the washers and the discs.

The intermediate disc 23 is slightly less in thickness than the thickness of the annular flange 20 which is formed on the inner face of the ring 19, and this construction provides a means whereby the intermediate disc will be free to rotate around the reduced portion 17 of the piston rod 11. As is clearly illustrated in Figure 3, the openings or ports in the several washers and the stationary discs are in registry or in communication with one another so as to provide a means whereby the fluid in the cylinder may pass through the piston during the upward and downward stroke of the piston in the cylinder. By actuating the pin 25, the intermediate disc 23 is rotated so that the ports or openings formed therein will be moved with relation to the ports or openings in the other discs, thus reducing the openings so as to regulate the amount of the fluid which will pass through the piston during the upward and downward movement of the piston in the cylinder.

A check valve 37 is provided at each end of the cylinder as is clearly shown in Figure 2, and as the check valve may be of any suitable construction well known in the art, a detailed description thereof is thought unnecessary.

During the upward movement of the piston 18 and the cylinder 2, the check valve 37 is moved to an open position, and pressure is built up in the upper portion of the cylinder. Manifestly, upon the down stroke of the piston, the check valve in the top of the cylinder will open, and air will be admitted to the cylinder, and at the same time, a pressure will be built up in the lower portion of the cylinder. In this manner, the shock absorber will at all times be positive and efficient in carrying out the purposes for which it is designed, and furthermore the provision of a shock absorber of the character described will minimize a shock incident to the vehicle passing over a rough road.

For the purpose of holding the discs and the washers in proper alinement, so that the ports will at all times be in communicating relation there may be provided a locking pin 38 which extends vertically through the washers and discs. The movable discs 23 is provided with an arcuate slot 39 to accommodate the pin 38, so that the latter will not interfere with the movement of the disc 23.

My improved shock absorber is of such a construction as to permit the same to be readily and easily attached to vehicle without necessitating any material alterations and after the disc 23 has been properly adjusted and the parts of the absorber are assembled, the device will at all times be positive and efficient in its operation.

While I have shown the preferred embodiment of my invention it is to be understood that minor changes in the size, shape and arrangement of parts may be resorted to without departing from the spirit of the invention and the scope of the appended claims.

Having thus described the invention, what I claim as new and desire to secure by Letters Patent is:—

1. A shock absorber comprising a cylinder, a piston operable therein, the same comprising a pair of opposed cup shaped washers adapted to engage the inner wall of the cylinder, a plurality of discs disposed between said washers, said washers and said discs being provided with communicating ports, one of said discs being movable for restricting the flow of a fluid through the ports.

2. A shock absorber comprising a cylinder, a piston operable therein, the same comprising a pair of opposed cup shaped washers adapted to engage the inner wall of the cylinder, a plurality of discs disposed between said washers, said washers and said discs being provided with communicating ports, one of said discs being movable for restricting the flow of a fluid through the ports, and means for holding the movable discs in any adjustable position.

3. A shock absorber comprising a cylinder, a piston operable therein, the same comprising a pair of opposed cup shaped washers, a ring interposed between said washers, an annular flange formed on the inner face of said ring, a pair of discs disposed adjacent the respective faces of said annular flange and adapted to engage the respective cup shaped washers, an intermediate disc interposed between the aforementioned discs and adapted for rotation within the annular flange, said discs and said washers being provided with communicating ports, and means associated with the movable discs for actuating the same whereby the area of the ports are restricted to regulate the flow of a fluid through the ports.

4. A shock absorber comprising a cylinder, a piston operable therein, the same comprising a pair of opposed cup shaped washers, a ring interposed between said washers, an annular flange formed on the inner face of said ring, a pair of discs disposed adjacent the respective faces of said annular flange and adapted to engage the respective cup shaped washers, an intermediate disc interposed between the aforementiond discs and adapted for rotation within the annular flange, said discs and said washers being provided with communicating ports, means associated with the movable disc for actuating the same whereby the area of the ports are restricted to regulate the flow of a fluid through the ports, said means comprising a pin extending laterally from the peripheral edge of the movable disc, said ring and said flange formed on the inner face thereof being provided with an elongated slot through which the pin extends.

5. A shock absorber comprising a cylinder, a piston operable therein, the same comprising a pair of opposed cup shaped washers, a ring interposed between said washers, an annular flange formed on the inner face of said ring, a pair of discs disposed adjacent the respective faces of said annular flange and adapted to engage the respective cup shaped washers, an intermediate disc interposed between the aforementioned discs and adapted for rotation within the annular flange, said discs and said washers being provided with communicating ports, means associated with the movable disc for actuating the same whereby the area of the ports are restricted to regulate the flow of a fluid through the ports, said means comprising a pin extending laterally from the peripheral edge of the movable disc, said ring and said flange formed on the inner face thereof being provided with an elongated slot through which the pin passes, the lower side of said slot formed in said ring being serrated for cooperation with the free end portion of the pin for holding the movable disc in any adjusted position.

In testimony whereof I affix my signature.

JOSEPH COSENTINO.